United States Patent
Liu et al.

(10) Patent No.: US 12,486,244 B2
(45) Date of Patent: Dec. 2, 2025

(54) PREPARATION OF SEMICARBAZIDE-SENSITIVE AMINE OXIDASE INHIBITOR AND USE THEREOF

(71) Applicants: ENNOVABIO (ZHEJIANG) PHARMACEUTICALS CO., LTD., Zhejiang (CN); SHANGHAI ENNOVABIO PHARMACEUTICALS CO., LTD., Shanghai (CN)

(72) Inventors: Shengyang Liu, Shanghai (CN); Jianwen Deng, Shanghai (CN); Zhiyong Feng, Shanghai (CN); Lei Jiang, Shanghai (CN); Zhi Qiao, Shanghai (CN); Ke Shang, Shanghai (CN); Xiaoping Xie, Shanghai (CN); Xueli Xu, Shanghai (CN); Yuan Xu, Shanghai (CN); Haixia Zhao, Shanghai (CN)

(73) Assignees: Ennovabio (Zhejiang) Pharmaceuticals Co., Ltd., Zhejiang (CN); Shanghai Ennovabio Pharmaceuticals Co., Ltd., Shanghai (CN)

( * ) Notice: Subject to any disclaimer, the term of this patent is extended or adjusted under 35 U.S.C. 154(b) by 699 days.

(21) Appl. No.: 17/759,341

(22) PCT Filed: Jan. 25, 2021

(86) PCT No.: PCT/CN2021/073649
§ 371 (c)(1),
(2) Date: Jul. 22, 2022

(87) PCT Pub. No.: WO2021/148032
PCT Pub. Date: Jul. 29, 2021

(65) Prior Publication Data
US 2023/0066737 A1    Mar. 2, 2023

(30) Foreign Application Priority Data

Jan. 23, 2020 (CN) .................. 202010076810.0

(51) Int. Cl.
*C07D 401/04* (2006.01)
*A61K 31/506* (2006.01)
(52) U.S. Cl.
CPC .................. *C07D 401/04* (2013.01)

(58) Field of Classification Search
CPC ....... C07D 401/04; A61K 31/506; A61P 3/10; A61P 9/00; A61P 25/00; A61P 29/00; A61P 35/00
USPC ........................................... 544/298; 514/269
See application file for complete search history.

(56) References Cited

U.S. PATENT DOCUMENTS

| | | | |
|---|---|---|---|
| 2018/0296560 A1 | 10/2018 | Fan et al. | |
| 2019/0276436 A1 | 9/2019 | Coates et al. | |
| 2020/0087248 A1 | 3/2020 | Sichuan | |

FOREIGN PATENT DOCUMENTS

| | | | | |
|---|---|---|---|---|
| CN | 108341752 A | 7/2018 | | |
| CN | 108778278 A | 11/2018 | | |
| CN | 108884056 A | 11/2018 | | |
| CN | 109251166 A | 1/2019 | | |
| WO | WO 2018/028517 A1 * | 2/2018 | ........... | A61K 31/506 |
| WO | 2018/196677 A1 | 11/2018 | | |
| WO | 2019/241751 A1 | 12/2019 | | |

OTHER PUBLICATIONS

International Search Report mailed Apr. 29, 2021corresponding to PCT/CN2021/073649 filed Jan. 25, 2021; 2 pages.

* cited by examiner

*Primary Examiner* — Charanjit Aulakh
(74) *Attorney, Agent, or Firm* — Ice Miller LLP

(57) ABSTRACT

The present invention provides preparation of a semicarbazide-sensitive amine oxidase inhibitor and use thereof. In particular, disclosed in the present invention are a compound as represented by formula I, or a stereoisomer or a racemate or a pharmaceutically acceptable salt of the compound. Also disclosed in the present invention is that the compound can inhibit semicarbazide-sensitive amine oxidase.

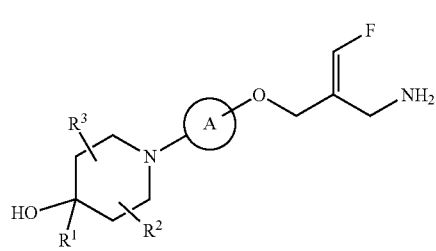

4 Claims, No Drawings

PREPARATION OF SEMICARBAZIDE-SENSITIVE AMINE OXIDASE INHIBITOR AND USE THEREOF

RELATED APPLICATIONS

This application is a U.S. National Stage Application under 35 U.S.C. 371 of International Patent Application No.: PCT/CN2021/073649, filed Jan. 25, 2021, which claims priority to Chinese Patent Application No.: 202010076810.0, filed Jan. 23, 2020.

FIELD OF THE INVENTION

The present invention relates to the field of pharmaceutical technology, and more specifically, relates to a class of semicarbazide-sensitive amine oxidase inhibitors.

BACKGROUND OF THE INVENTION

Semicarbazide-sensitive amine oxidase (SSAO) is a type of amine oxidase containing dopamine quinone groups, which is a member of the semicarbazide-sensitive amine oxidase family and is also called vascular adhesion protein-1, VAP-1 (vascular adhesion protein 1). It is encoded by the AOC3 gene in animals. Abundant SSAO expression/activity was found in smooth muscle cells, adipocytes, and endothelial cells of mammals. It is also expressed in various organs such as the vasculature, cartilage and kidney. SSAO in mammals mainly exists in two forms, the membrane-bound and soluble form. The activity of the enzyme varies greatly among different species and different tissues of the same species. SSAO can catalyze and metabolize endogenous or food amines into aldehydes, and produce hydrogen peroxide and ammonia. The natural metabolic substrates in the body are mainly aliphatic amines and aromatic amines, wherein methylamine (MA) and aminoacetone are recognized as the two major physiological substrates of SSAO, which are catalyzed into formaldehyde and pyruvaldehyde (methylglyoxal), respectively. In endothelial cells, SSAO/VAP-1 mediates the adhesion of leukocytes to endothelial cells and their exudation.

A large number of studies have confirmed that SSAO and its metabolites are closely related to atherosclerosis, diabetes and complications thereof, obesity, stroke, chronic kidney disease, retinopathy, chronic obstructive pulmonary disease (COPD), autoimmune diseases, multiple sclerosis, rheumatoid arthritis, pain caused by arthritis, Alzheimer's disease and other inflammation-related diseases. It is reported that SSAO/VAP-1 also plays an important role in cancer biology. SSAO/VAP-1 small molecule inhibitors inhibit neoangiogenesis and reduce the number of myeloid leukocytes in melanoma and lymphoma. In recent years, studies have also suggested that SSAO plays a role in the occurrence and development of liver diseases such as fatty liver disease. Fatty liver disease may develop into non-alcoholic fatty liver after combination with inflammation and progression, and a certain proportion of patients will further develop into liver fibrosis, cirrhosis and even liver cancer after a period of time.

Given that the function of SSAO plays an important role in the pathological process of various inflammation/fibrosis-related diseases, finding highly effective inhibitors is of great value and significance for controlling diseases caused by excessive SSAO expression/activity.

BRIEF SUMMARY OF THE INVENTION

The purpose of the present invention is to provide a class of novel SSAO inhibitors and their preparation and use thereof.

In the first aspect of the present invention, a compound according to Formula I, or stereoisomers or racemates thereof, or pharmaceutically acceptable salts thereof are provided:

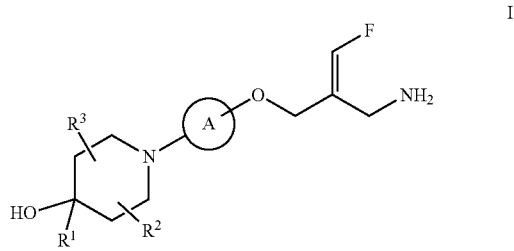

wherein,
A is selected from the groups consisting of a substituted or unsubstituted 5-12 membered heteroaromatic ring;
$R^1$ is selected from the groups consisting of H, a substituted or unsubstituted C1-C8 alkyl, substituted or unsubstituted-$(CH_2)_m$—O—C1-C8 alkyl, substituted or unsubstituted C3-C8 cycloalkyl, —C(O)NR$^4$R$^5$;
m is selected from 1, 2, 3 or 4;
$R^2$, $R^3$ are each independently selected from the groups consisting of H, F, —OH, =O, —CN, a substituted or unsubstituted C1-C8 alkyl, substituted or unsubstituted C3-C8 cycloalkyl, substituted or unsubstituted-O—C1-C8 alkyl, substituted or unsubstituted-O—C3-C8 cycloalkyl, substituted or unsubstituted-C6-C10 aryl, substituted or unsubstituted-O—C1-C4 alkyl-C6-C10 aryl, substituted or unsubstituted-S—C1-C8 alkyl; or $R^2$, $R^3$ individually or together with the carbon atom(s) to which they are attached, form a 3-8 membered carbocyclic ring, or a 3-8 membered heterocyclic ring ($R^2$, $R^3$ are attached to the same or different carbon atom);
$R^4$, $R^5$ are each independently selected from the groups consisting of H, —OH, a substituted or unsubstituted C1-C8-alkyl, substituted or unsubstituted C3-C8 cycloalkyl, substituted or unsubstituted-C6-C10 aryl, substituted or unsubstituted-C1-C4 alkyl (C6-C10 aryl), substituted or unsubstituted-C1-C4 alkyl (C3-C8 cycloalkyl); or $R^4$, $R^5$ together with the nitrogen atom to which they are attached form a substituted or unsubstituted 3-8 membered heterocyclic group;
provided that the above-mentioned groups together form a chemically stable structure; unless otherwise specified, the above-mentioned cycloalkyl, heterocyclyl, aryl and heteroaryl groups include any ring form, including monocyclic, fused, bridged or spirocyclic ring;
unless otherwise specified, the "substituted" means that one or more hydrogen atoms on a group are substituted with a substituent selected from the groups consisting of oxo (=O), hydroxy, substituted or unsubstituted C5-C6 cycloalkyl, substituted or unsubstituted 5-6 membered heterocycle containing 1 nitrogen atom, 4-6 membered heterocycle containing 1 oxygen atom, C1-C6 alkyl, C1-C6 alkoxy, fluoro C1-C6 alkoxy, C1-C6 alkoxy substituted C1-C6 alkoxy, C1-C6 alkylcarbonyl, C2-C6 amide, C1-C6 alkyl-NH—, (C1-C6 alkyl) (C1-C6 alkyl)N—; and the "substituted" means that the above groups are substituted with a group selected from a C1-C6 alkoxy, or C1-C6 alkylcarbonyl.

In another preferred embodiment, $R^2$ and $R^3$ are each independently selected from the groups consisting of H, F, =O, —CN, substituted or unsubstituted C1-C8-alkyl, substituted or unsubstituted C3-C8 cycloalkyl, substituted or unsubstituted-O—C1-C8alkyl, substituted or unsubstituted-O—C3-C8 cycloalkyl; or $R^2$ and $R^3$ independently or together with the carbon atoms to which they are attached, form a 3-8 membered carbocyclic ring, or a 3-8 membered heterocyclic ring ($R^2$ and $R^3$ are attached to the same or different carbon atom).

In another preferred embodiment, the ring A is a substituted or unsubstituted 5-7 membered heteroaromatic ring.

In another preferred embodiment, the ring A is

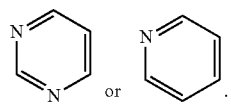

In another preferred embodiment, the compound of formula I has a structure shown in the following formula:

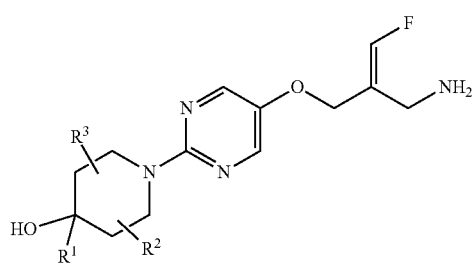

II

In another preferred embodiment, $R^1$ is selected from the groups consisting of H, substituted or unsubstituted C1-C8 alkyl, substituted or unsubstituted —(CH$_2$)$_m$—O—C1-C8 alkyl, substituted or unsubstituted C3-C8 cycloalkyl, —C(O)NR$^4$R$^5$;

wherein m is 1, 2, 3 or 4.

In another preferred embodiment, the compound is selected from the following groups:

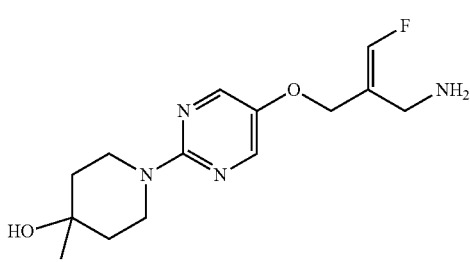

-continued

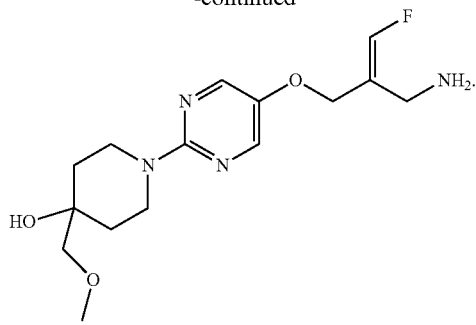

In the second aspect of the present invention, a pharmaceutical composition is provided, comprising a therapeutically effective amount of a compound according to the first aspect of the present invention, or stereoisomers or racemates thereof, or pharmaceutically acceptable salts thereof, and a pharmaceutically acceptable excipient.

In another preferred embodiment, the pharmaceutical composition is used for preventing and/or treating diseases related to SSAO or regulated by SSAO/VAP-1 protein; and preferably, the diseases are selected from the groups consisting of inflammatory diseases and/or inflammation-related diseases, diabetes and/or diabetes-related diseases, mental disorders, ischemic diseases, vascular diseases, ocular diseases, fibrosis, neuroinflammatory diseases, cancer, pain-related diseases or tissue transplant rejection.

In another preferred embodiment, the inflammatory diseases and/or inflammation-related diseases are selected from the groups consisting of arthritis (including juvenile rheumatoid arthritis) and pain caused by arthritis, Crohn's disease, ulcerative colitis, inflammatory bowel disease (e.g., irritable bowel syndrome), psoriasis, asthma, pneumonia, chronic obstructive pulmonary disease (COPD), bronchiectasis, skin inflammation, ocular disease, contact dermatitis, hepatitis, liver autoimmune disease, autoimmune hepatitis, primary biliary cirrhosis, sclerosing cholangitis, autoimmune cholangitis, alcoholic liver disease, atherosclerosis, chronic heart failure, congestive heart failure, ischemic disease, stroke and complications thereof, myocardial infarction and complications thereof, inflammatory cell destruction after stroke, synovitis, systemic inflammatory sepsis, etc.

In another preferred embodiment, the inflammatory diseases and/or inflammation-related diseases are selected from the groups consisting of arthritis (including juvenile rheumatoid arthritis) and pain caused by arthritis, Crohn's disease, ulcerative colitis, inflammatory bowel disease (e.g., irritable bowel syndrome), psoriasis, asthma, pneumonia, chronic obstructive pulmonary disease (COPD), bronchiectasis, skin inflammation, ocular disease, contact dermatitis, hepatitis, liver autoimmune disease, autoimmune hepatitis, primary biliary cirrhosis, sclerosing cholangitis, autoimmune cholangitis, alcoholic liver disease, atherosclerosis, chronic heart failure, congestive heart failure, ischemic disease, stroke and complications thereof, myocardial infarction and complications thereof, inflammatory cell destruction after stroke, synovitis, systemic inflammatory sepsis, etc.

In another preferred embodiment, the pain is selected from the groups consisting of muscle pain, bone and arthrosis pain, neuropathic pain, pain caused by tumor, low back pain, inflammatory pain etc.

In another preferred embodiment, the diabetes and/or diabetes-related diseases are type I diabetes, type II diabetes, X syndrome, diabetic retinopathy, diabetic nephropathy, diabetic neuropathy or diabetic macular edema.

In another preferred embodiment, the ocular diseases are uveitis or macular degeneration.

In another preferred embodiment, the fibrosis is selected from the groups consisting of cystic fibrosis, idiopathic pulmonary fibrosis, liver fibrosis, including non-alcoholic fatty liver disease such as non-alcoholic steatohepatitis (NASH) and alcohol-induced fibrosis causing liver cirrhosis, renal fibrosis, scleroderma, radiation-induced fibrosis, and complications caused by fibrosis.

In another preferred embodiment, the neuroinflammatory diseases are selected from the groups consisting of stroke, Parkinson's disease, Alzheimer's disease, vascular dementia, multiple sclerosis, chronic multiple sclerosis, etc.

In another preferred embodiment, the cancer is selected from the groups consisting of lung cancer, breast cancer, colorectal cancer, anal cancer, pancreatic cancer, prostate cancer, ovarian cancer, liver and bile duct cancer, esophageal cancer, non-Hodgkin Lymphoma, bladder cancer, uterine cancer, glioma, glioblastoma, medulloblastoma and other brain tumors, kidney cancer, head and neck cancer, stomach cancer, multiple myeloma, testicular cancer, germ cell tumor, neuroendocrine tumor, cervical cancer, benign tumors of the gastrointestinal tract, breast and other organs, signet ring cell carcinoma, mesenchymal cell tumors including sarcoma, fibrosarcoma, hemangioma, angiomatosis, hemangiopericytoma, pseudoangiomatous stromal hyperplasia, myofibroblastoma, fibromatosis, inflammatory myofibroblastoma, lipoma, angiolipoma, granulosa cell tumor, fibroneuronoma, schwannoma, angiosarcoma, liposarcoma, rhabdomyosarcoma, osteosarcoma, leiomyoma or leiomyosarcoma.

In another preferred embodiment, the diabetes and/or diabetes-related diseases are type I diabetes, type II diabetes, syndrome X, diabetic retinopathy, diabetic nephropathy, diabetic neuropathy or diabetic macular edema.

In another preferred embodiment, the psychiatric disorders are severe depression, bipolar depression or attention deficit hyperactivity disorder.

In another preferred embodiment, the ischemic diseases are stroke and/or complications thereof, myocardial infarction and/or complications thereof, or damage to tissues by inflammatory cells after stroke.

In another preferred embodiment, the vascular diseases are atherosclerosis, chronic heart failure or congestive heart failure.

In another preferred embodiment, the arthritis is osteoarthritis, rheumatic arthritis, rheumatoid arthritis or juvenile rheumatoid arthritis.

In another preferred embodiment, the systemic inflammatory syndrome is systemic inflammatory sepsis.

In another preferred embodiment, the inflammatory bowel disease is irritable bowel disease.

In another preferred example, the liver diseases are liver autoimmune disease, autoimmune hepatitis, primary biliary cirrhosis, sclerosing cholangitis, autoimmune cholangitis, alcoholic liver disease or non-alcoholic fatty liver disease.

In another preferred embodiment, the respiratory diseases are asthma, acute lung injury, acute respiratory distress syndrome, lung inflammation, chronic obstructive pulmonary disease, bronchitis or bronchiectasis.

In another preferred embodiment, the ocular diseases are uveitis, iritis, retinitis, autoimmune ocular inflammation, inflammation or macular degeneration caused by angiogenesis and/or lymphogenesis.

In another preferred embodiment, the skin diseases are contact dermatitis, skin inflammation, psoriasis or eczema.

In another preferred embodiment, the neuroinflammatory diseases are Parkinson's disease, Alzheimer's disease, vascular dementia, multiple sclerosis or chronic multiple sclerosis.

In another preferred embodiment, the non-alcoholic fatty liver diseases are non-alcoholic simple fatty liver, non-alcoholic steatohepatitis, non-alcoholic fatty liver disease-related cryptogenic liver cirrhosis, or primary liver cancer.

In the third aspect of the present invention, the use of the compound according to the first aspect of the present invention, or stereoisomers or racemates thereof, or pharmaceutically acceptable salts thereof, or the pharmaceutical composition according to the second aspect of the present invention is provided, wherein it is used for the preparation of drugs on preventing and/or treating diseases related to SSAO or regulated by SSAO/VAP-1 protein or activity.

In another preferred embodiment, the diseases related to SSAO or regulated by the SSAO/VAP-1 protein or activity are selected from the groups consisting of inflammatory diseases and/or inflammation-related diseases, diabetes and/or diabetes related diseases, mental disorders, ischemic diseases, vascular diseases, ocular diseases, fibrosis, neuroinflammatory diseases, cancer, fibrosis or tissue transplant rejection.

In one embodiment of the method and use of the present invention, the diseases are diabetes-induced diseases selected from diabetic nephropathy, glomerulosclerosis, diabetic retinopathy, non-alcoholic fatty liver disease, and choroidal neovascularization.

In another embodiment of the method and use of the present invention, the diseases are neuroinflammatory diseases. In other embodiments of the methods and uses of the present invention, the diseases are selected from liver fibrosis, liver cirrhosis, renal fibrosis, idiopathic pulmonary fibrosis, and radiation-induced fibrosis. In other embodiments of the method and use of the invention, the disease is cancer.

It should be understood that, within the scope of the present invention, the above-mentioned technical features herein and the technical features specifically described in the following (such as the examples) can be combined with each other, thereby constituting new or preferred technical solutions which need not be specified again herein.

EMBODIMENTS FOR CARRYING OUT THE INVENTION

The inventor discovered a class of SSAO small molecule inhibitors after extensive and in-depth research for the first time. The present invention was completed on this basis.

Terms

Unless otherwise defined, all technical and scientific terms used herein have the same meaning as commonly understood by one of ordinary skill in the art to which this invention belongs.

As used herein, the terms "containing" or "comprising (including)" can be an open form, semi-closed form, and closed form. In other words, the terms also include "substantially consisting of" or "consisting of".

As used herein, the term "alkyl" refers to a fully saturated straight or branched hydrocarbon chain group consisting of only carbon and hydrogen atoms and connected to the rest of the molecule via a single bond; having, for example, 1 to 12 (preferably 1 to 8, more preferably 1 to 6) carbon atoms, such as but not limited to methyl, ethyl, n-propyl, iso-propyl, n-butyl, iso-butyl, sec-butyl, tert-butyl, n-pentyl, 2-methylbutyl, 2,2-dimethylpropyl, n-hexyl, heptyl, 2-methylhexyl, 3-methylhexyl, octyl, nonyl and decyl and the like. For the purpose of the present invention, the term "C1-C6 alkyl" refers to alkyl groups containing 1 to 6 carbon atoms.

As used herein, the term "alkoxyl" refers to an alkyloxy. The alkyl group is as defined above.

As used herein, the term "cycloalkyl" refers to cyclic alkyl groups consisting only of carbon atoms and hydrogen atoms. For example, it includes but is not limited to cyclopropyl, cyclobutyl, cyclopentyl, cyclohexyl, etc., and the cycloalkyl group may optionally have condensed ring, spiro ring or bridged ring structure. "C3-C5 cycloalkyl" refers to cyclic alkyl groups having 3 to 5 carbon atoms; and "C5-C6 cycloalkyl" refers to cyclic alkyl groups having 5 to 6 carbon atoms.

The term "5-12 membered heterocyclyl" or "5-12 membered heterocyclic ring" as a group or part of other groups herein refers to stable 5- to 12-membered non-aromatic cyclic groups composed of carbon atoms and 1 to 3 heteroatoms selected from nitrogen, oxygen, sulfur. Unless otherwise specified in the specification, the heterocyclyl may be monocyclic, bicyclic, tricyclic or more ring system, which may include a fused ring system, bridged ring system or spiro ring system; nitrogen, carbon or sulfur atoms in the heterocyclic group can be optionally oxidized; nitrogen atoms can be optionally quaternized; and the heterocyclyl can be partially or fully saturated. The heterocyclyl can be connected to the rest of the molecule through single bond via a carbon atom or heteroatom. In heterocyclyl containing fused rings, one or more rings may be aryl or heteroaryl as defined below, provided that the junction to the rest of the molecule is non-aromatic ring atoms. Examples of heterocyclic groups include, but are not limited to: tetrahydropyrrolyl, morpholinyl, piperazinyl, piperidinyl, thiomorpholinyl, 2,7-diaza-spiro[3.5]nonane-7-yl, 2-oxa-6-aza-spiro[3.3]heptane-6-yl, 2,5-diaza-bicyclo[2.2.1]heptan-2-yl, azetidinyl, pyranyl, tetrahydropyranyl, thiopyranyl, tetrahydrofuranyl, oxazinyl, dioxanyl, tetrahydroisoquinolinyl, decahydroisoquinolinyl, imidazolinyl, imidazolidinyl, quinazinyl, thiazolidinyl, isothiazolidinyl, isoxazolidinyl, indoline, octahydroindolyl, octahydroisoindolyl, pyrrolidinyl, pyrazolidinyl, phthalimido, etc.

As used herein, the term "5-6 membered heterocyclic ring containing 1 nitrogen atom" refers to 5- or 6-membered heterocyclic rings containing only one nitrogen atom in the ring.

As used herein, the term "4-6 membered heterocyclic ring containing 1 oxygen atom" refers to 4-membered, 5-membered or 6-membered heterocyclic rings containing only one oxygen atom in the ring.

As used herein, the term "5-6 membered aromatic ring" refers to 5- or 6-membered aromatic rings.

As used herein, the term "5-6 membered heteroaromatic ring" refers to 5- or 6-membered aromatic rings having 1-3 heteroatoms selected from nitrogen, sulfur, or oxygen.

As used herein, the term "halo" refers to fluoro, chloro, bromo or iodo.

The Compounds of the Present Invention

The compounds of the present invention are the compound according to Formula I, or stereoisomers or racemates thereof, or pharmaceutically acceptable salts thereof.

The compounds of the present invention may contain one or more chiral carbon atoms, and therefore can produce enantiomers, diastereomers and other stereoisomeric forms. Each chiral carbon atom can be defined as (R)- or (S)-based on stereochemistry. The present invention intends to include all possible isomers, as well as racemates and optically pure forms thereof. For the preparation of the compounds herein, racemates, diastereomers or enantiomers can be selected as raw materials or intermediates. Optically active isomers can be prepared using chiral synthons or chiral reagents, or resolved using conventional techniques, such as crystallization and chiral chromatography, etc.

Conventional techniques for preparing/separating individual isomers include chiral synthesis from suitable optically pure precursors, or resolution of racemates (or racemates of salts or derivatives) using, for example, chiral high performance liquid chromatography, see for example Gerald Gübitz and Martin G. Schmid (Eds.), Chiral Separations, Methods and Protocols, Methods in Molecular Biology, Vol. 243, 2004; A. M. Stalcup, Chiral Separations, Annu. Rev. Anal. Chem. 3:341-63, 2010; Furniss et al. (eds.), VOGEL'S ENCYCLOPEDIA OF PRACTICAL ORGANIC CHEMISTRY 5.sup.TH ED., Longman Scientific and Technical Ltd., Essex, 1991, 809-816: Heller, Acc. Chem. Res. 1990, 23, 128.

The term "pharmaceutically acceptable salts" includes pharmaceutically acceptable acid addition salts and pharmaceutically acceptable base addition salts.

"Pharmaceutically acceptable acid addition salts" refer to salts formed with an inorganic acid or organic acid that can retain the biological effectiveness of the free base without other side effects. Inorganic acid salts include, but are not limited to, hydrochloride, hydrobromide, sulfate, nitrate, phosphate, etc.; organic acid salts include, but are not limited to, formate, acetate, 2,2-dichloroacetate, trifluoroacetate, propionate, caproate, caprylate, caprate, undecylenate, glycolate, gluconate, lactate, sebacate, adipate, glutarate, malonate, oxalate, maleate, succinate, fumarate, tartrate, citrate, palmitate, stearate, oleate, cinnamate, laurate, malate, glutamate, pyroglutamate, aspartate, benzoate, methanesulfonate, benzenesulfonate, p-toluenesulfonate, alginate, ascorbate, salicylate, 4-aminosalicylate, naphthalenedisulfonate, etc. These salts can be prepared by methods known in the art.

"Pharmaceutically acceptable base addition salts" refer to salts formed with inorganic base or organic base that can maintain the biological effectiveness of the free acid without other side effects. Salts derived from inorganic bases include, but are not limited to, sodium, potassium, lithium, ammonium, calcium, magnesium, iron, zinc, copper, manganese, aluminum, and the like. Preferred inorganic salts are ammonium, sodium, potassium, calcium and magnesium salts. Salts derived from organic bases include, but are not limited to the following salts: primary amines, secondary amines and tertiary amines, substituted amines including natural substituted amines, cyclic amines and basic ion exchange resins, such as ammonia, isopropylamine, trimethylamine, diethylamine, triethylamine, tripropylamine, ethanolamine, diethanolamine, triethanolamine, dimethylethanolamine, 2-dimethylaminoethanol, 2-diethylaminoethanol, dicyclohexylamine, lysine, arginine, histidine, caffeine, procaine, choline, betaine, ethylenediamine, glucosamine, methylglucosamine, theobromine, purine, piperazine, piperidine, N-ethylpiperidine, polyamine resin, etc. Preferred organic bases include isopropylamine, diethylamine, ethanolamine, trimethylamine, dicyclohexylamine, choline and caffeine. These salts can be prepared by methods known in the art.

Preparation Method

The following reaction scheme exemplarily illustrates the method for preparing the compound of Formula I, or stereoisomer or racemate thereof, or pharmaceutically acceptable salts thereof, wherein each group is as described above. It should be understood that combinations of substituents and/or variables in the formula are permissible only when such combinations result in stable compounds in the following reaction schemes. It should also be understood that other formula can be prepared by those skilled in the field of organic chemistry by the methods disclosed herein (by applying appropriately substituted starting materials and modifying the synthesis parameters as needed using methods well known to those skilled in the art) or known methods.

Those skilled in the art should also understand that some functional groups of the intermediate compounds may need to be protected by appropriate protecting groups in the methods described below. Such functional groups include hydroxyl, amino, mercapto and carboxylic acid. Suitable hydroxy-protecting groups include trialkylsilyl or diarylalkylsilyl (e.g. tert-butyldimethylsilyl, tert-butyldiphenylsilyl or trimethylsilyl), tetrahydropyranyl, benzyl, etc. Suitable protecting groups for amino, amidino and guanidino include tert-butoxycarbonyl, benzyloxycarbonyl, etc. Suitable protecting groups for sulfhydryl include —C(O)—R" (wherein R" is alkyl, aryl or aralkyl), p-methoxybenzyl, trityl, etc. Suitable carboxy protecting groups include alkyl, aryl or aralkyl esters.

Protecting groups can be introduced and removed according to standard technique known to those skilled in the art and as described herein. The use of protecting groups has been described in Greene, T. W. and P. G. M. Wuts, Protective Groups in Organic Synthesis, (1999), 4th Ed., Wiley in detail. The protecting groups can also be polymer resins.

Application

The compounds of the present invention have excellent SSAO inhibitory activity and can be used in a pharmaceutical composition with the compounds of the present invention as active ingredient for preventing and/or treating diseases related to SSAO or regulated by SSAO/VAP-1 protein, such as atherosclerosis, diabetes and complications thereof, obesity, stroke, chronic kidney disease, chronic obstructive pulmonary disease (COPD), autoimmune disease, multiple sclerosis, rheumatoid arthritis, pain caused by arthritis, Alzheimer's disease, ocular disease, liver disease (such as fatty liver, hepatitis, liver fibrosis, liver cirrhosis, liver cancer).

In the application, the term "pharmaceutical composition" refers to preparations of the compounds of the present invention and medium generally accepted in the art for the delivery of biologically active compounds to mammals (such as human). The medium includes a pharmaceutically acceptable carrier. The purpose of the pharmaceutical composition is to facilitate the administration to the body, which is beneficial to the absorption of the active ingredient and thus exerting biological activity.

In the application, the term "pharmaceutically acceptable" refers to a substance (such as carriers or diluents) that does not affect the biological activity or properties of the compound, and is relatively non-toxic, that is, the substance can be administered to individuals without causing undesirable biological reactions or interactions with any components included in the composition in an undesirable manner.

In the application, the term "pharmaceutically acceptable excipients" includes, but is not limited to any adjuvants, carriers, excipients, glidants, sweeteners, diluents, preservatives, dyes/colorants, flavors, surfactants, wetting agents, dispersants, suspending agents, stabilizers, isotonic agents, solvents or emulsifiers as acceptable for human or livestock use approved by relevant government authorities.

In the application, the terms "preventive", "prevention" and "preventing" include reducing the possibility of the disease occurring or deterioration in patients.

In the application, the term "treatment" and other similar synonyms include the following meanings:
(i) preventing the occurrence of disease or condition in mammals, especially when such mammals are susceptible to the disease or disorder, but has not been diagnosed as suffering the disease or disorder;
(ii) inhibiting disease or condition, that is, curbing the development;
(iii) relieving disease or condition, that is, retreating the state of disease or condition; or
(iv) easing the symptoms caused by the disease or condition.

In the application, the term "effective amount", "therapeutically effective amount" or "pharmaceutical effective amount" refers to the amount of at least one agent or compound, which is sufficient to relieve one or more symptoms of the disease or condition treated to some extent after administration. The result can be the reduction and/or alleviation of signs, symptoms or causes, or any other desired changes in the biological system. For example, the "effective amount" for treatment is the amount of the composition containing the compound disclosed herein required to provide significant disease relief clinically. Methods such as dose escalation trial can be used to determine the effective amount suitable for any individual case.

In the application, the terms "administration", "administrate", "administrating" and the like refer to methods capable of delivering compounds or compositions to desired site for biological action. These methods include, but are not limited to, oral route, transduodenal route, parenteral injection (including intravenous, subcutaneous, intraperitoneal, intramuscular, intra-arterial injection or infusion), topical administration, and rectal administration. Those skilled in the art are familiar with administration technique that can be used for the compounds and methods described herein, for example those discussed in Goodman and Gilman, The Pharmacological Basis of Therapeutics, current ed.; Pergamon; and Remington's, Pharmaceutical Sciences (current edition), Mack Publishing Co., Easton, Pa. In a preferred embodiment, the compounds and compositions discussed herein are administered orally.

In the application, the terms "drug combination", "combined use of drugs", "combination drug", "administration of other treatments", "administration of other therapeutic agents", etc. refer to medical treatment obtained by mixing or combining more than one active ingredient, which includes fixed and non-fixed combinations of active ingredients. The term "fixed combination" refers to the simultaneous administration of at least one compounds described herein and at least one synergistic agents to patients in the form of single entity or single dosage form. The term "non-fixed combination" refers to the simultaneous administration, combined administration or sequential administration at variable intervals of at least one compounds described herein and at least one synergistic agents to patient in the form of separate entities. These also apply to cocktail therapy, such as the administration of three or more active ingredients.

The relative inhibitory activity of the compounds can be measured by the amount required to inhibit the SSAO/VAP-1 amine oxidase activity in a variety of ways, for example, in vitro tests using recombinant human protein or recombinant non-human enzymes, cellular tests using cells expressing normal rodent enzymes, tests on cells transfected with human protein, in vivo tests in rodents and other mammals, etc.

The methods for inhibiting SSAO/VAP-1 in patients suffering from inflammatory diseases and treating inflammatory diseases using the compounds described by Formula I and II are also disclosed. Human inflammatory diseases include arthritis and pain caused by arthritis, Crohn's disease, irritable bowel syndrome, psoriasis, asthma, chronic obstructive pulmonary disease, bronchiectasis, joint sclerosis, inflammation caused by diabetes, and inflammatory cell destruction after stroke.

Therefore, in one aspect, the present invention relates to the method for inhibiting amine oxidase in individuals in need thereof. The method comprises administering an effective amount of the compound of Formula I or Formula II to the individual to produce positive therapeutic responses.

In another aspect, the present invention relates to the method for treating diseases associated with amine oxidase. The method comprises administering a therapeutically effective amount of the compound of Formula I or Formula II to individuals in need thereof.

In another aspect, the present invention relates to the method for treating diseases regulated by SSAO/VAP-1. The method comprises administering a therapeutically effective amount of the compound of Formula I or Formula II to individuals in need thereof.

The above method is applicable where the diseases are inflammation. As used herein, "inflammation" includes various indications, including arthritis (including juvenile rheumatoid arthritis), Crohn's disease, ulcerative colitis, inflammatory bowel disease (e. g., irritable bowel syndrome), psoriasis, asthma, pneumonia, chronic obstructive pulmonary disease (COPD), bronchiectasis, skin inflammation, ocular disease, contact dermatitis, hepatitis, liver autoimmune disease, autoimmune hepatitis, primary biliary cirrhosis, sclerosing cholangitis, autoimmune cholangitis, alcoholic liver disease, atherosclerosis, chronic heart failure, congestive heart failure, ischemic disease, stroke and complications thereof, myocardial infarction and complications thereof, inflammatory cell destruction after stroke, synovitis, systemic inflammatory sepsis, etc.

The above method is also applicable where the diseases are type I diabetes, type II diabetes and complications thereof.

The above method is also applicable where the diseases are macular degeneration and/or other ocular diseases.

The above method is also applicable where the diseases are fibrosis. As used herein, "fibrosis" includes such diseases like cystic fibrosis, idiopathic pulmonary fibrosis, liver fibrosis, including non-alcoholic fatty liver disease such as non-alcoholic steatohepatitis (NASH) and alcohol-induced fibrosis causing liver cirrhosis, renal fibrosis, scleroderma, radiation-induced fibrosis, and other diseases in which excessive fibrosis contributes to disease pathology.

The above method is also applicable for the treatment of neuroinflammatory diseases. As used herein, "neuritis diseases" include various indications, including stroke, Parkinson's disease, Alzheimer's disease, vascular dementia, multiple sclerosis, chronic multiple sclerosis, etc.

The above method is also applicable to pain-related diseases selected from but not limited to the following group: muscle pain, bone and arthrosis pain, neuropathic pain, pain caused by tumor, lumbago and backache, inflammatory pain etc.

The above method is also applicable to the treatment of cancer. In one embodiment, the cancer is selected from lung cancer, breast cancer, colorectal cancer, anal cancer, pancreatic cancer, prostate cancer, ovarian cancer, liver and bile duct cancer, esophageal cancer, non-Hodgkin Lymphoma, bladder cancer, uterine cancer, glioma, glioblastoma, medulloblastoma and other brain tumors, kidney cancer, head and neck cancer, stomach cancer, multiple myeloma, testicular cancer, germ cell tumor, neuroendocrine tumor, cervical cancer, benign tumors of the gastrointestinal tract, breast and other organs, signet ring cell carcinoma, mesenchymal cell tumors including sarcoma, fibrosarcoma, hemangioma, angiomatosis, hemangiopericytoma, pseudoangiomatous stromal hyperplasia, myofibroblastoma, fibromatosis, inflammatory myofibroblastoma, lipoma, angiolipoma, granulosa cell tumor, fibroneuronoma, schwannoma, angiosarcoma, liposarcoma, rhabdomyosarcoma, osteosarcoma, leiomyoma or leiomyosarcoma.

The present inventions will be further illustrated below with reference to the specific examples. It should be understood that these examples are only to illustrate the invention but not to limit the scope of the invention. The experimental methods with no specific conditions described in the following examples are generally performed under the conventional conditions, or according to the manufacturer's instructions. Unless indicated otherwise, percentage and parts are calculated by weight.

The experimental materials and reagents used in the following examples can be obtained from commercial channels unless otherwise specified.

Synthesis of Intermediate A:

tert-Butyl (E)-(2-(bromomethyl)-3-fluoroallyl)carbamate

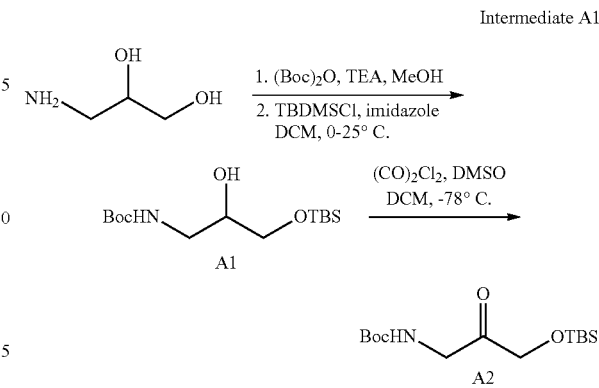

-continued

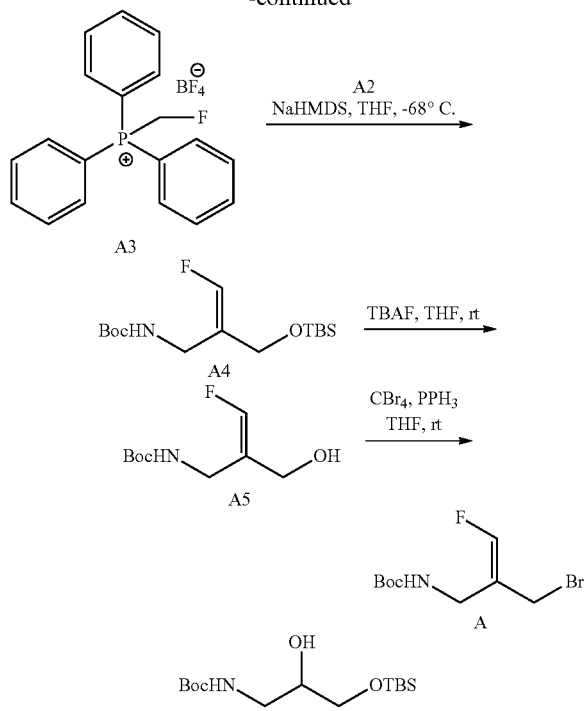

To a stirred solution of 3-aminopropane-1,2-diol (400 g, 4395.6 mmol) and triethylamine (665.9 g, 6593.4 mmol) in methanol (4 L) was added di-tert-butyl dicarbonate (1040.1 g, 4835.2 mmol) at 0-10° C. The reaction solution was stirred at 25° C. for 2 hours, and then concentrated under reduced pressure until no methanol remained. The residue was dissolved in dichloromethane (5 L), then imidazole (448.6 g, 6593.4 mmol) was added. At 0-10° C., a solution of TBDMSCl (791.2 g, 5274.7 mmol) in dichloromethane (1 L) was slowly dropped into the above solution. The mixture was stirred at room temperature for 2 hours after addition, and 1% citric acid solution (2 L) was added. The organic phase was separated, washed twice with saturated brine, dried over anhydrous sodium sulfate, and concentrated in vacuo to provide a colorless oil. The oil was dissolved in n-heptane (5 L), washed with 5% brine, dried over anhydrous sodium sulfate, and concentrated to afford crude Intermediate A1 as a colorless oil (1206.6 g, 91%).

Intermediate A2:

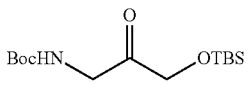

To a solution of oxalyl chloride (203.4 g, 1603.2 mmol) in anhydrous dichloromethane (3000 mL), anhydrous DMSO (158.4 g, 2030.8 mmol) was slowly added under nitrogen atmosphere at −78° C. After addition, the reaction solution was stirred at −78° C. for 30 minutes, then a solution of Intermediate A1 (326.0 g, 1068.8 mmol) in dry dichloromethane (500 mL) was slowly dropped into the reaction solution. After addition, the reaction solution was stirred at −78° C. for another 1 hour. Triethylamine (545.1 g, 5344.0 mmol) was slowly added at −78° C. After addition, the reaction solution was warmed to room temperature and stirred for another hour and monitored by TLC. After starting materials were consumed, water (1000 mL) was added to the reaction solution. The organic layer was separated, the aqueous layer was extracted with dichloromethane (200 mL×2), and the organic layers were combined, dried over anhydrous sodium sulfate and concentrated to provide a crude product. The crude was dissolved in 3 L of n-heptane, washed with 3% brine, and then concentrated to obtain a crude product, which was purified by distillation to afford the Intermediate A2 (225.0 g, 70.1%) as a colorless oil.

Intermediate A4:

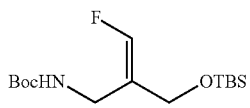

A solution of sodium bis(trimethylsilyl)amide (2 M, 1673.0 mL, 3346.0 mmol) in tetrahydrofuran was slowly dropped into a solution of the Intermediate A3 (438.0 g, 1148.6 mmol) in anhydrous tetrahydrofuran (1000 mL) at −68° C. After addition, the reaction solution was stirred at −68° C. for 1 hour. A solution of Intermediate A2 (290.0 g, 956.0 mmol) in tetrahydrofuran (400 mL) was slowly dropped into the reaction solution under −68° C. After addition, the reaction solution was stirred at −68° C. for another 8 hour. The reaction solution was warmed to 0° C. and stirred for 2 hours, and monitored by LCMS. After starting materials were consumed, water (1000 mL) was added to the reaction solution and the mixture was extracted with ethyl acetate (500 mL×3). The organic layers were combined, washed with saturated brine (200 mL×2), dried over anhydrous sodium sulfate and concentrated to provide a crude product. 1 Kg of silica gel was added to the crude product, eluted with petroleum ether, and concentrated to provide a crude product. The residue was distilled under reduced pressure to afford Intermediate A4 (173.0 g, 46.2%, E/Z=10:1) as a light yellow oil. MS(ESI): m/z=264.15 [M−56+H]$^+$.

Intermediate A5:

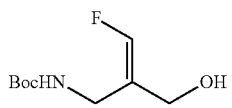

To a solution of Intermediate A4 (173.0 g, 538.9 mmol, E:Z=10:1) in tetrahydrofuran (400 mL), TBAF tetrahydrate (170.0 g, 538.9 mmol) was added at 0° C. After addition, the reaction solution was warmed to room temperature, stirred for 1 hour, and monitored by LCMS. After starting materials were consumed, water (1000 mL) was added to the reaction and the mixture was extracted with ethyl acetate (400 mL×2). The organic layers were combined, washed with 0.1 N aqueous hydrochloric acid (200 mL×2) and saturated brine (100 mL×2), dried over anhydrous sodium sulfate and evaporated in vacuo to provide a crude product. The crude product was purified by distillation under reduced pressure to afford the Intermediate A5 (104.0 g, 94.2%, E:Z=10:1) as a light yellow oil.

$^1$H NMR (400 MHz, CDCl$_3$) δ 6.59 (d, J=83.7 Hz, 1H), 5.01 (brs, 1H), 3.95 (s, 2H), 3.91 (dd, J=6.5, 1.6 Hz, 2H), 3.81 (brs, 1H), 1.43 (s, 9H).

Intermediate A:

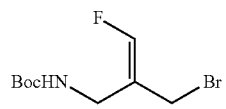 [SMILES: CC(C)(C)OC(=O)NC/C(=C\F)CBr]

A solution of CBr$_4$ (251.9 g, 761.0 mmol) in anhydrous 1,2-dichloromethane (100 mL) was slowly dropped to a solution of Intermediate A5 (104.0 g, 507.3 mmol) and triphenylphosphine (199.4 g, 761.0 mmol) in anhydrous 1,2-dichloromethane (580 mL) at ° C. After addition, the reaction solution was warmed to room temperature and stirred for 30 minutes, and monitored by LCMS. After starting material in the reaction solution was consumed, the reaction solution was evaporated in vacuo to afford a crude product. The crude product was purified by column chromatography (petroleum ether:ethyl acetate=10:1) to afford the title Intermediate A as a white solid (E:Z=10:1), which was recrystallized twice in petroleum ether (500 mL) to provide Intermediate A (85.5 g, 63.2%, E:Z=50:1) as a white solid.

$^1$H NMR (400 MHZ, CDCl$_3$) δ 6.77 (d, J=81.2 Hz, 1H), 4.76 (brs, 1H), 4.00 (d, J=4.6 Hz, 2H), 3.95 (dd, J=3.4, 0.6 Hz, 2H), 1.45 (s, 9H).

Synthesis of Intermediate B:

tert-Butyl (E)-(2-(((2-chloropyrimidin-5-yl)oxy)methyl)-3-fluoroallyl)carbamate

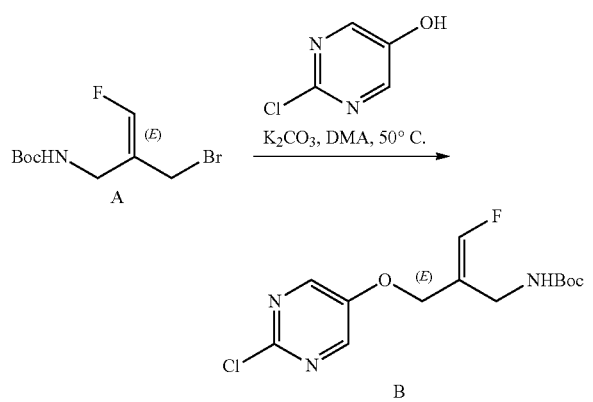

Intermediate B:

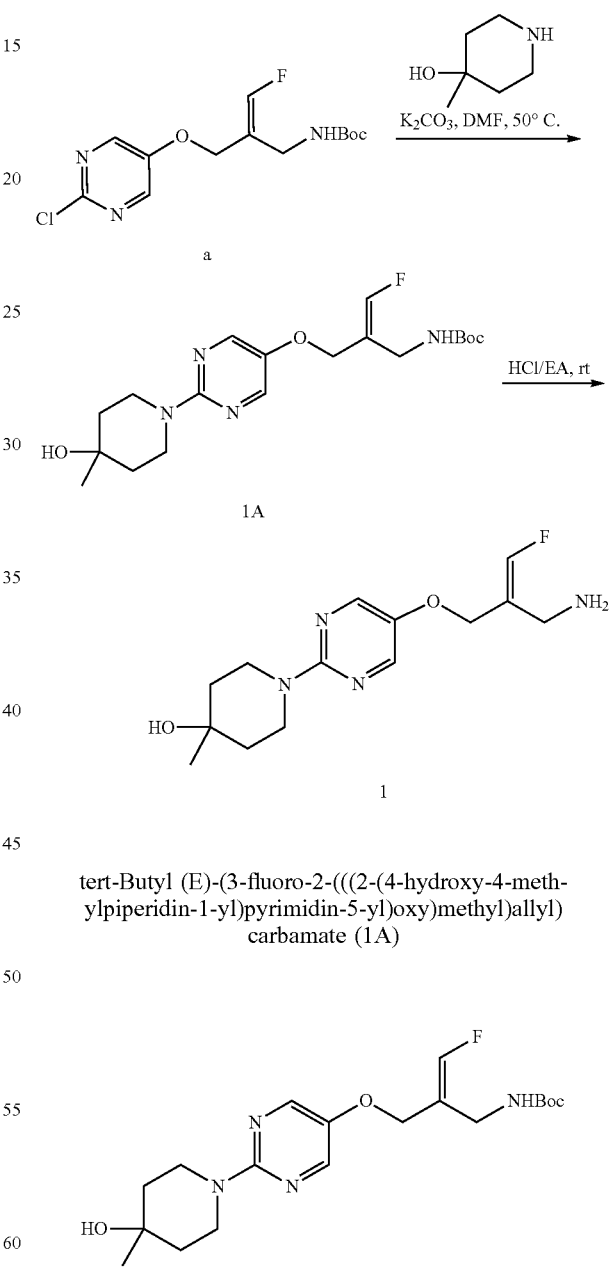

To a solution of 2-chloropyrimidine-5-phenol (5720 mg, 44.0 mmol), K$_2$CO$_3$ (7600 mg, 55.0 mmol) in N, N-dimethylacetamide (80 mL) was added Intermediate A (9800 mg, 36.7 mmol). The mixture was reacted at 50° C. for 3 hours. After the reaction was completed, the reaction solution was cooled to room temperature and slowly added to water (800 mL) dropwise. The solid was slowly precipitated. The mixture was stirred at room temperature for 2 hours until the solid was uniform. The solid was filtered, washed with water, and dried. 200 mL of solvent (petroleum ether:ethyl acetate=10:1) was added and triturated for 6 hours. The solid was filtered and dried to afford the Intermediate B (9600 mg, 82.5%) as an off-white solid. MS(ESI): m/z=262.0 [M−55]$^+$.

Example 1: (E)-1-(5-((2-(Aminomethyl)-3-fluoroallyl)oxy)pyrimidin-2-yl)-4-methylpiperidin-4-ol tert-Butyl (E)-(3-fluoro-2-(((2-(4-hydroxy-4-methylpiperidin-1-yl)pyrimidin-5-yl)oxy)methyl)allyl)carbamate (1A)

To 4-methylpiperidin-4-ol (70 mg, 0.6 mmol), Intermediate B (96 mg, 0.3 mmol) in N,N-dimethylformamide (2 mL) was added potassium carbonate (125 mg, 0.9 mmol). The mixture was heated at 50° C. for 16 hours. After the reaction was completed, the reaction solution was purified by high performance liquid chromatography (mobile phase: acetonitrile/ammonium bicarbonate aqueous solution) to afford the title compound 1A (100 mg, 84%) as a white solid. MS(ESI): m/z=397.0 [M+H]$^+$.

(E)-1-(5-((2-(Aminomethyl)-3-fluoroallyl)oxy)pyrimidin-2-yl)-4-methylpiperidin-4-ol (1)

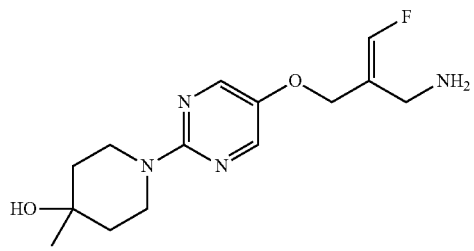 [SMILES: CC1(O)CCN(c2ncc(OC/C(=C/F)CN)cn2)CC1]

At 0° C., hydrochloric acid in ethyl acetate (4M, 4 mL) was added to 1A (100 mg, 0.25 mmol). The mixture was reacted at room temperature for 1 hour. After the reaction was completed, the reaction solution was concentrated and purified by high performance liquid chromatography (mobile phase: acetonitrile/ammonium bicarbonate aqueous solution) to afford the title compound 1 (59.4 mg, 79%) as a yellowish gum. MS(ESI): m/z=297.2 [M+H]$^+$.

$^1$H NMR (400 MHZ, CD$_3$OD) δ 8.12 (s, 2H), 6.98 (s, 0.5H), 6.77 (s, 0.5H), 4.51 (d, J=2.8 Hz, 2H), 4.07 (t, J=4.1 Hz, 1H), 4.04 (t, J=4.2 Hz, 1H), 3.50-3.41 (m, 4H), 1.62-1.49 (m, 4H), 1.22 (s, 3H).

Example 2: (E)-1-(5-((2-(aminomethyl)-3-fluoroallyl)oxy)pyrimidin-2-yl)-4-(methoxymethyl)piperidin-4-ol

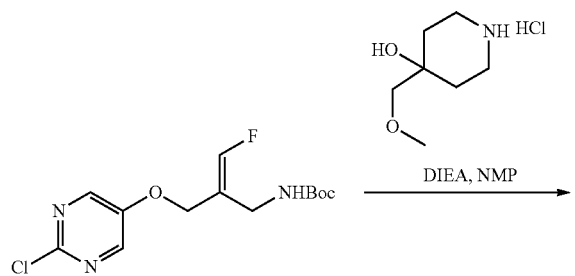

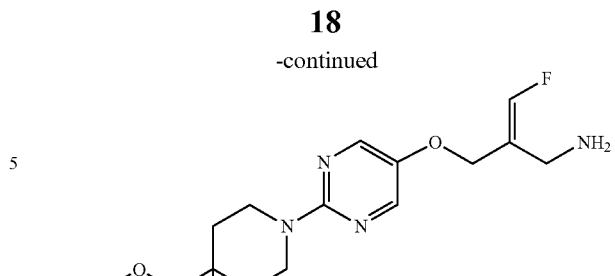

Preparation of tert-Butyl (E)-(3-fluoro-2-(((2-(4-hydroxy-4-(methoxymethyl)piperidin-1-yl)pyrimidin-5-yl)oxy)methyl)allyl)carbamate (2A)

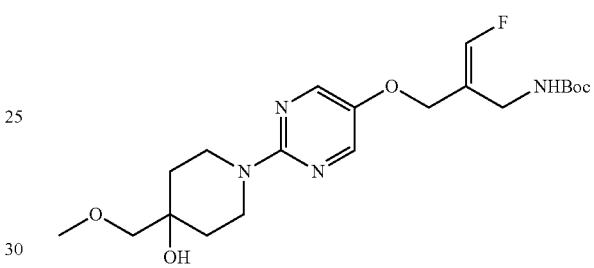

To a 10 mL vial equipped with a magnetic stirrer, tert-butyl (E)-(2-(((2-chloropyrimidin-5-yl)oxy)methyl)-3-fluoroallyl)carbamate (50 mg, 0.157 mmol), 4-(methoxymethyl)piperidin-4-ol hydrochloride (31 mg, 0.173 mmol), N-ethyl-N-isopropylpropan-2-amine (87 mg, 0.314 mmol) and N-methylpyrrolidone (0.6 mL) were added sequentially. The reaction solution was sealed and heated to 90° C. and stirred for 18 hours. LCMS indicated the reaction was completed. The reaction solution was cooled to room temperature and filtered, and the filtrate was purified by preparative high performance liquid chromatography (mobile phase: acetonitrile/formic acid) to obtain tert-butyl (E)-(3-fluoro-2-(((2-(4-hydroxy-4-(methoxymethyl)piperidin-1-yl)pyrimidin-5-yl)oxy)methyl)allyl)carbamate (18 mg, 26.8%) as a pale yellow solid. LCMS (ESI): m/z=427.0 [M+H]$^+$.

Preparation of (E)-1-(5-((2-(aminomethyl)-3-fluoroallyl)oxy)pyrimidin-2-yl)-4-(methoxymethyl)piperidin-4-ol (2)

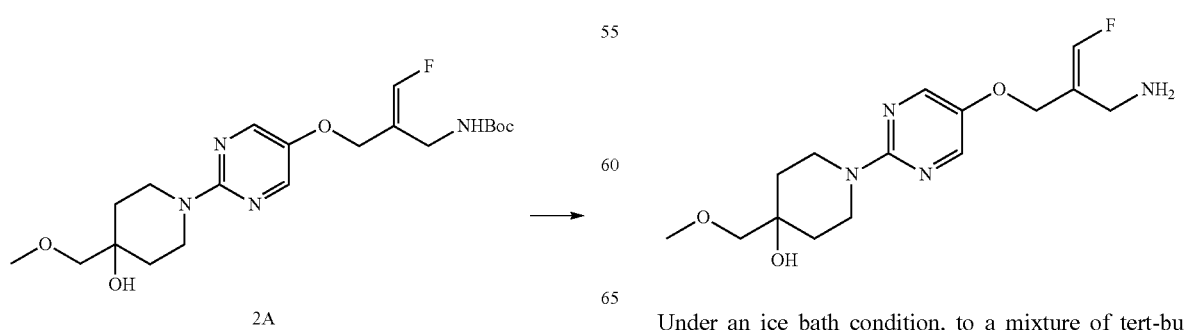

Under an ice bath condition, to a mixture of tert-butyl (E)-(3-fluoro-2-(((2-(4-hydroxy-4-(methoxymethyl)piperidin-1-yl)pyrimidin-5-yl)oxy)methyl)allyl)carbamate (18 mg, 0.042 mmol) in ethyl acetate (0.2 mL) was added hydrochloric acid in ethyl acetate (4M, 2.0 ml). The reaction solution was stirred at 25° C. for 1 hour for complete reaction, as monitored by LCMS. The reaction mixture was concentrated under reduced pressure. The resulting residue was purified by preparative high performance liquid chromatography (mobile phase: acetonitrile/formic acid) to obtain (E)-1-(5-((2-(aminomethyl)-3-fluoroallyl)oxy)pyrimidin-2-yl)-4-(methoxymethyl)piperidin-4-ol (11 mg, 80%) as a white solid. LCMS(ESI): m/z=327.2 [M+H]$^+$.

$^1$H NMR (400 MHZ, CD$_3$OD) δ 8.55 (s, 1H), 8.19 (s, 2H), 7.17 (d, J=81.4 Hz, 1H), 4.60 (d, J=2.9 Hz, 2H), 4.31 (d, J=13.2 Hz, 2H), 3.80 (d, J=1.7 Hz, 2H), 3.40-3.35 (m, 4H), 3.26 (s, 2H), 1.64 (ddd, J=23.0, 16.0, 8.9 Hz, 4H).

Biological Test Example 1: Assay of In Vitro Inhibitory Activity of the Compounds on SSAO/VAP-1

This assay was used to evaluate the in vitro inhibitory activity of the compounds against SSAO/VAP-1 of different species. Recombinant human SSAO protein, mouse SSAO protein or rat SSAO protein (provided by Eli Lilly) were used. The enzyme activity detection kit, MAO-Glo Assay kit (V1402) was purchased from Promega. Enzyme reaction buffer (50 mM HEPES, 120 mM NaCl, 5 mM KCl, 2 mM CaCl$_2$, 1.4 mM MgCl$_2$, 0.001% Tween-20, pH 7.4) was prepared. The test compounds were dissolved in DMSO and serially diluted by 3-fold. The final concentration of test compound in a 10 µL reaction system was 1 µM to 0.05 nM when SSAO activity was detected. The content of DMSO in the detection reaction system was 1%. After the DMSO solution of test compounds was diluted in the enzyme reaction buffer at a volume ratio of 1:25, 2.5 µL of the solution was added to each well of detection plate with two replicates for each concentration. 5 µL of SSAO protein diluted in the enzyme reaction buffer was added to each well, the final concentration of which was 10 nM to 80 nM in 10 µL reaction system. The mixture was incubated at room temperature for 10 minutes. 2.5 µL of the reaction substrate diluted in the enzyme reaction buffer was added to each well, the final concentration of which was 10 µM in 10 µL reaction system. After the mixture was incubated at room temperature for 120 minutes, 10 µL of detection reagent was added to each well. The reaction solution was incubated for 20 minutes at room temperature, and the plate was read with Synergy Neo 2 for detection. The value was converted into inhibition rate by the following formula:

Inhibition rate=(Signal$_{positive}$−Signal$_{test}$)/(Signal$_{positive}$−Signal$_{negative}$)×100%

Signal$_{positive}$ was signal of positive control wells without test compounds added. Signal$_{negative}$ was signal of negative control wells without test compounds and SSAO enzyme, and Signal$_{test}$ was detection signal of each compound at different concentrations. IC$_{50}$ value was calculated by using 4 parameters curve fitting. For compounds with an inhibition rate of less than 50% within test range of the compound, IC$_{50}$ value was reported as greater than the highest tested concentration.

After testing, the compounds in the examples of the present invention can effectively inhibit the SSAO/VAP-1 enzymatic activity of different species, and the results are shown in Table 1.

Biological Test Example 2: Assay of Inhibitory Activity of the Compounds on MAO-A and MAO-B Recombinant human MAO-A and MAO-B protein was purchased from Sigma (M7316, M7441). Other reagents were the same as Biological Test Example 1. The final concentration of test compound in 10 µL reaction system was 100 µM to 5 nM when MAO-A and MAO-B activity were detected. The final concentrations of MAO-A and MAO-B protein in 10 µL reaction system were 70 nM and 300 nM, respectively, while other reaction conditions were the same as those in Biological Test Example 1. Data analysis and IC$_{50}$ calculation methods were the same as those in Biological Test Example 1. For compounds with an inhibition rate of less than 50% within test range of the compound, IC$_{50}$ value was reported as greater than the highest tested concentration. The results are shown in Table 1.

Biological Test Example 3: Assay of Inhibitory Activity of the Compounds on AOC1

Recombinant human AOC1/DAO protein was purchased from R&D systems (Cat: 8298-AO). Amplex UltraRed was purchased from Thermo scientific (Cat: A36006). HRP (Cat: P8250) and Putrescine (Cat: V900377) were purchased from Sigma. Enzyme reaction buffer (50 mM HEPES, 120 mM NaCl, 5 mM KCl, 2 mM CaCl$_2$, 1.4 mM MgCl$_2$, 0.001% Tween-20, pH7.4) was prepared. Test compound was dissolved in DMSO and serially diluted by 3-fold. The final concentration of test compound in 10 µL reaction system was 100 µM to 5 nM when AOC1 activity was detected. The content of DMSO in detection reaction system was 1%. After the DMSO solution of test compound was diluted in the enzyme reaction buffer at a volume ratio of 1:25, 10 µL of mixture was added to each well of detection plate. 4× substrate mixture (containing 400 µM Putrescine, 4U/mL HRP, 4 µM Amplex UltraRed) was prepared in the enzyme reaction buffer, 10 µL of which was added to each well. 20 µL of AOC1 protein diluted in enzyme reaction buffer was added to each well and the final concentration was 0.4 nM in 40 µL reaction system. Synergy Neo 2 was used to read the plate for detection. The instrument was set at 30° C., 530 nM excitation wavelength, 590 nm emission wavelength. Detection was conducted once every minute for 30 minutes continuously. The enzyme activity was calculated based on the increased signal of each well from the 10$^{th}$ minute to the 30$^{th}$ minute. The value was converted into inhibition rate by the following formula Inhibition rate=(Signal$_{positive}$−Signal$_{test}$)/(Signal$_{positive}$−Signal$_{negative}$)×100%

Signal$_{positive}$ was signal of positive control wells without test compounds added. Signal$_{negative}$ was signal of negative control wells without test compounds added and AOC1, and Signal$_{test}$ was detection value of different compounds at each concentration. IC$_{50}$ value was calculated by using 4 parameters curve fitting. For compounds with an inhibition rate of less than 50% within test range of the compound, IC$_{50}$ value was reported as greater than the highest tested concentration. The results were shown in Table 1.

Biological Test Example 4: Assay of Inhibitory Activity of the Compounds on AOC2

Recombinant human AOC2 protein (provided by Eli Lilly). Other reagents were the same as those in Biological Test Example 1. The final concentration of test compound in 10 μL reaction system was 100 μM to 5 nM when AOC2 activity was detected, while other reaction conditions were the same as those in Biological Test Example 1. Data analysis and $IC_{50}$ calculation method were the same as those in Biological Test Example 1. For compounds with an inhibition rate of less than 50% within test range of the compound, $IC_{50}$ value was reported as greater than the highest tested concentration. The results were shown in Table 1.

TABLE 1

$IC_{50}$ (nM) of the compounds in vitro inhibitory activity against different species SSAO and other amine oxidases

| | Human SSAO | AOC1 | AOC2 | MAO-A | MAO-B |
|---|---|---|---|---|---|
| 1 | A | E | G | I | L |
| 2 | A | D | G | J | L |

| Enzyme | Letter | Inhibitory activity $IC_{50}$ (nM) |
|---|---|---|
| Human SSAO | A | <10 |
| | B | 10~100 |
| | C | >100 |
| AOC1 | D | 100~10000 |
| | E | >10000 |
| AOC2 | F | 100~1000 |
| | G | >1000 |
| MAO-A | H | 1000~10000 |
| | I | 10000~100000 |
| MAO-B | J | >100000 |
| | K | 5000~20000 |
| | L | >20000 |

The above results show that the compounds of the present invention exhibit excellent inhibitory activity against AOC3, and quite good selectivity for AOC3.

All literatures mentioned in the present application are incorporated herein by reference, as though each one is individually incorporated by reference. Additionally, it should be understood that after reading the above teachings, those skilled in the art can make various changes and modifications to the present invention. These equivalents also fall within the scope defined by the appended claims.

The invention claimed is:

1. A compound of formula I, or a stereoisomer, a racemate or a pharmaceutically acceptable salt thereof:

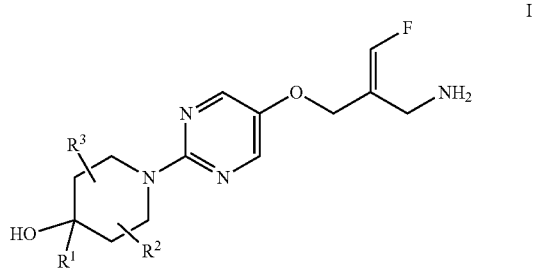

wherein,
$R^1$ is selected from the group consisting of a substituted or unsubstituted C1-C8 alkyl and substituted or unsubstituted-$(CH_2)_m$—O—C1-C8 alkyl;
m is selected from the group consisting of: 1, 2, 3 and 4; and
$R^2$, $R^3$ are each independently selected from the group consisting of H, F, CN, and a substituted or unsubstituted C1-C8 alkyl;
unless otherwise specified, the "substituted" means that one or more hydrogen atoms on a group are substituted with a substituent selected from the group consisting of hydroxy, C1-C6 alkoxy, fluoro and C1-C6 alkoxy.

2. The compound of claim 1, or a stereoisomer, racemate, or the pharmaceutically acceptable salt thereof, wherein $R^2$ and $R^3$ are each independently selected from the group consisting of H and F.

3. The compound of claim 1, wherein the compound is selected from the group consisting of:

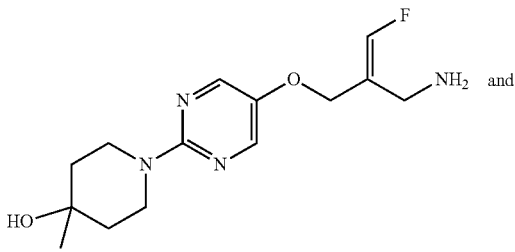 and

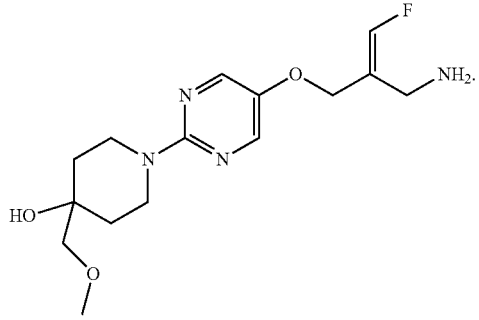

4. A pharmaceutical composition, comprising therapeutically effective amount of the compound according to claim 1, or stereoisomers or racemates thereof, or pharmaceutically acceptable salts thereof, and a pharmaceutically acceptable excipient.

* * * * *